(12) United States Patent
D'Agostini

(10) Patent No.: US 7,874,616 B2
(45) Date of Patent: Jan. 25, 2011

(54) HORIZONTAL LUMBAR SUSPENSION FOR VEHICLE SEATS

(75) Inventor: Roberto D'Agostini, Piossasco (IT)

(73) Assignee: Lear Corporation, Southfield, MI (US)

( * ) Notice: Subject to any disclaimer, the term of this patent is extended or adjusted under 35 U.S.C. 154(b) by 61 days.

(21) Appl. No.: 12/233,129

(22) Filed: Sep. 18, 2008

(65) Prior Publication Data

US 2010/0066136 A1 Mar. 18, 2010

(51) Int. Cl.
*B60N 2/42* (2006.01)

(52) U.S. Cl. .............................. 297/216.12; 297/284.4

(58) Field of Classification Search ............ 297/216.12, 297/284.4, 284.7, 284.8
See application file for complete search history.

(56) References Cited

U.S. PATENT DOCUMENTS

| 5,462,335 | A | | 10/1995 | Seyler | |
|---|---|---|---|---|---|
| 5,769,490 | A | * | 6/1998 | Falzon | 297/284.4 |
| 5,823,620 | A | | 10/1998 | Le Caz | |
| 5,954,399 | A | * | 9/1999 | Hong | 297/284.4 |
| 6,375,262 | B1 | * | 4/2002 | Watanabe | 297/284.4 |
| 6,644,740 | B2 | | 11/2003 | Holst et al. | |
| 6,837,541 | B2 | | 1/2005 | Farquhar et al. | |
| 6,883,867 | B2 | | 4/2005 | Klingler | |
| 6,908,153 | B2 | | 6/2005 | Blendea | |
| 6,918,634 | B2 | | 7/2005 | Elliot | |
| 6,991,288 | B2 | | 1/2006 | Farquhar et al. | |
| 7,083,232 | B2 | | 8/2006 | Frank | |
| 7,097,247 | B2 | | 8/2006 | Battey et al. | |
| 7,128,372 | B2 | | 10/2006 | Farquhar et al. | |
| 7,131,694 | B1 | * | 11/2006 | Buffa | 297/284.4 |
| 7,252,335 | B2 | | 8/2007 | Samain et al. | |
| 7,328,950 | B2 | * | 2/2008 | McMillen et al. | 297/284.4 |
| 7,585,027 | B2 | * | 9/2009 | Blendea | 297/284.4 |
| 2004/0178670 | A1 | * | 9/2004 | Klingler | 297/284.4 |
| 2009/0102255 | A1 | | 4/2009 | D'Agostini et al. | |

FOREIGN PATENT DOCUMENTS

| EP | 0420824 A1 | 4/1991 |
|---|---|---|
| EP | 0537839 A1 | 4/1993 |

* cited by examiner

*Primary Examiner*—Sarah B McPartlin
(74) *Attorney, Agent, or Firm*—Brooks Kushman P.C.

(57) ABSTRACT

An adjustable lumbar assembly for a vehicle seat is provided with a wireframe for attachment to a frame of the seat. The wireframe has a pair of spaced apart side members. A flexible lumbar support band has a pair of outboard portions affixed to the side members, a pair of lateral portions extending inboard from the outboard portions and pivotally connected to the outboard portions offset from the side members. A central portion of the support band is pivotally connected to the lateral portions. A cable assembly is mounted to the outboard portions for extension and retraction of the lateral portions and the central portion for providing adjustment of the lumbar assembly. A method for manufacturing an adjustable lumbar assembly is provided by forming a wireframe with the side members, inserting the wireframe into a mold, and molding a flexible lumbar support band to the wireframe side members.

20 Claims, 3 Drawing Sheets

HORIZONTAL LUMBAR SUSPENSION FOR VEHICLE SEATS

BACKGROUND

1. Field of the Invention

Embodiments of the invention relate to lumbar suspensions for vehicle seats.

2. Background Art

Prior art vehicle seats are provided with horizontal lumbar suspensions. Prior art vehicle seats are also provided with active head restraint systems. An example of a vehicle seat with a horizontal lumbar suspension and an active head restraint system is disclosed in U.S. Pat. No. 6,837,541 B2, which issued on Jan. 4, 2005.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
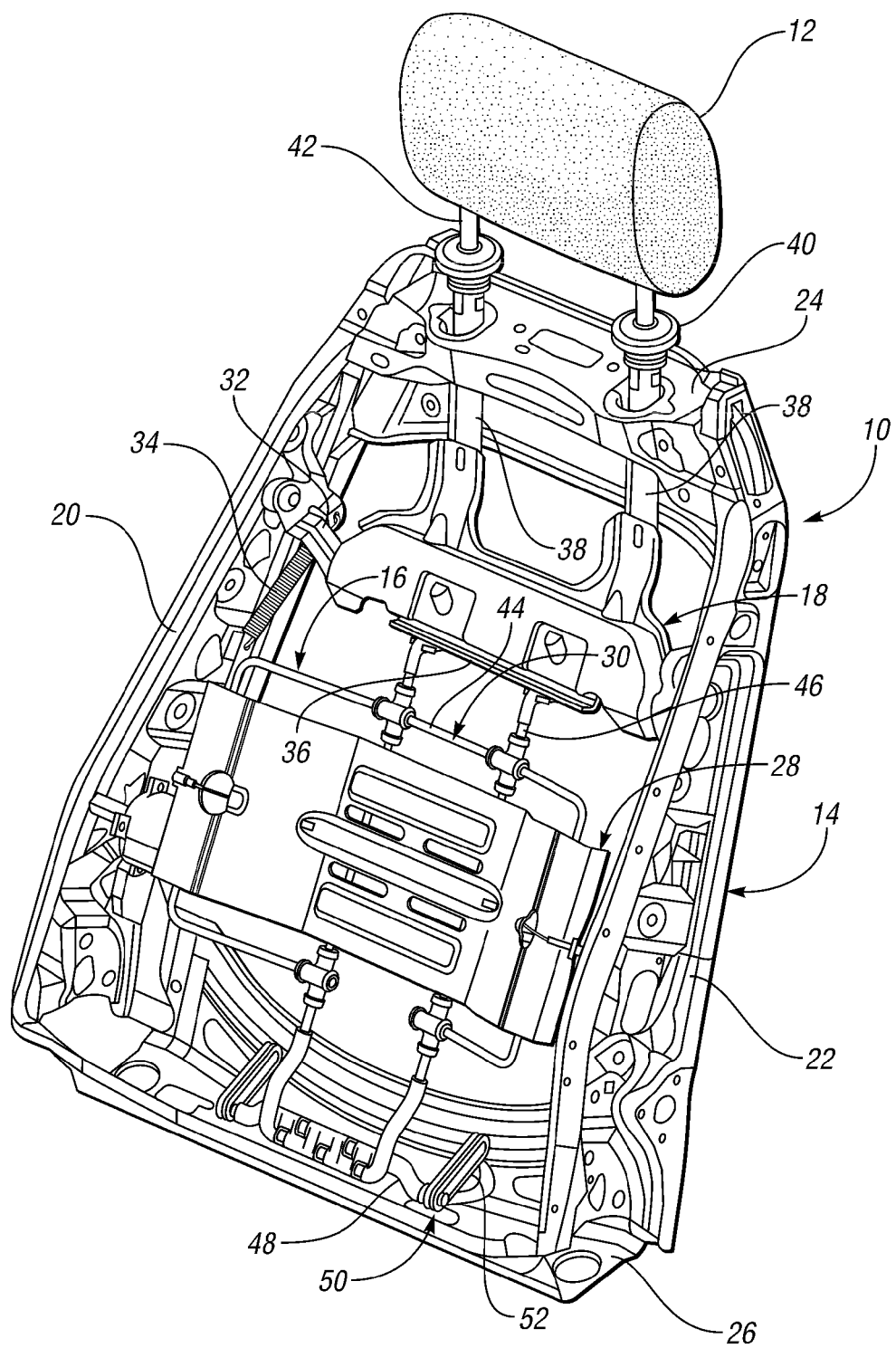
FIG. 1 is a front side perspective view of a seat back of a vehicle seat according to embodiments of the invention, illustrated with a lumbar assembly.

With reference now to FIG. 1, a seat back for a vehicle seat is illustrated according to an embodiment of the present invention and is referenced generally by numeral 10. The vehicle seat includes a seat cushion (not shown) that is adapted to be installed within an interior of a vehicle, such as an automobile, aircraft, water craft or the like, for seating an occupant. The seat back 10 is also installed in the vehicle for supporting the back of an occupant. The seat back 10 may be mounted directly to the vehicle or connected to the seat cushion. Although an individual seat is depicted in FIG. 1, the invention contemplates any seat configuration, such as a bench seat, a split frame seat, a front row seat, a rear row seat, or the like. The seat cushion and the seat back 10 are both fabricated from suitable and known materials and manufacturing methods. For example, the seat cushion may utilize a structural frame, foam for cushioning, and a covering.

In the description, various embodiments, operating parameters, and components of the embodiments that are described with directional language, such as "upper," "lower," "upright," and words of similar import, designate directions shown in the drawings or that are understood in the field of the art. Such directional terminology is used for relative description and clarity and is not intended to limit the orientation of any embodiment or component of any embodiment to a particular direction or orientation.

The seat back 10 extends from the seat cushion. The seat also includes a head restraint 12 extending above the seat back 10 for supporting the head of the occupant against the head restraint 12. The seat back 10 is illustrated with a cover and padding removed for depicting internal components. The seat back 10 includes a frame 14 for providing structural support for the seat back 10. The seat back 10 includes a horizontally actuatable lumbar suspension 16 for providing support to the occupant, while providing adjustability so that the occupant can select the desired level of comfort and support. In at least one embodiment, the seat back frame 14 includes a pair of laterally spaced apart side supports 20, 22 that are each mounted to lateral ends of an upper cross support 24 and a lower cross support 26.

The lumbar suspension 16 includes a flexible lumbar support band 28 mounted to a wireframe 30. According to at least one embodiment, the lumbar suspension 16 is an input for an active head restraint system 18. Accordingly, the wireframe 30 is connected to the seat frame 14 and to the active head restraint system 18.

The active head restraint system 18 has a pair of links 32 each pivotally connected to one of the side supports 20, 22. A pair of extension springs 34 are each connected to one of the links 32 and the corresponding side supports 20, 22 to urge the links 32 to a design position which is illustrated in FIG. 1. An armature 36 is pivotally connected to each of the links 32. A pair of posts 38 extend upright from the armature 36 and extend through the upper cross support 24. A pair of sleeves 40 are each provided within one of the posts 38 for receiving a pair of rods 42, which extend from the head restraint 12 and cooperate with the sleeves 40 for height adjustment of the head restraint 12 relative to the seat back 10.

The wireframe 30 includes a laterally extending cross member 44 for supporting the support band 28. The wireframe 30 also includes a pair of upright wires 46 for mounting the lumbar suspension 16 to the frame 14 and to the active head restraint system 18. A cross wire 48 is mounted to a lower end of the upright wires 46 and extends through a pair of guides 50 on the lower cross support 26. The guides 50 each include a slot 52 which receives the cross wire 48 and is inclined in a rearward direction. The guides 50 provide a pivotal connection of the lumbar suspension 16 with the frame 14 while also permitting the lower end of the lumbar suspension 16 to translate upward and rearward in response to an impact condition.

The upper ends of the upright wires 46 are pivotally connected to the armature 36 so that an input force to the lumbar suspension 16 during an impact condition actuates the armature 36 upward and rearward. The actuation of the armature 36 causes the links 32 to pivot relative to the side supports 22, as the armature 36 translates upward and rearward and pivots in a forward direction. This motion of the armature 36 thereby extends the posts 38 upward from the upper cross support 24, and pivots the posts 38 in a forward direction such that the head restraint 12 is actuated upward and forward for moving the head restraint 12 closer to the occupant's head in an impact condition. In absence of an impact force, the extension springs 34 return the links 32, and consequently the active head restraint system 18 and the lumbar suspension 16, to the design position illustrated in FIG. 1.

Thus, upon receipt of an impact to the lumbar suspension 16, such as a body of the occupant that exceeds a predetermined force to overcome the extension springs 34, the lumbar suspension 16 actuates the active head restraint system for moving the head restraint 12 closer to the head of the occupant for minimizing whiplash during an impact condition. The input force may be generated, for example, when the vehicle impacts another object thereby accelerating the seat into the occupant. Such an impact condition may be generated from a rear impact. Likewise, the impact condition may be generated from a forward impact wherein the occupant rebounds from a seat harness or other mechanism, into the seat.

Prior art head restraint systems often utilize vertically actuatable lumbar support mechanisms. The lumbar suspension 16 demonstrates a suitable horizontally actuatable lumbar suspension 16 that can be utilized in combination with an active head restraint system 18.

Figure 2:
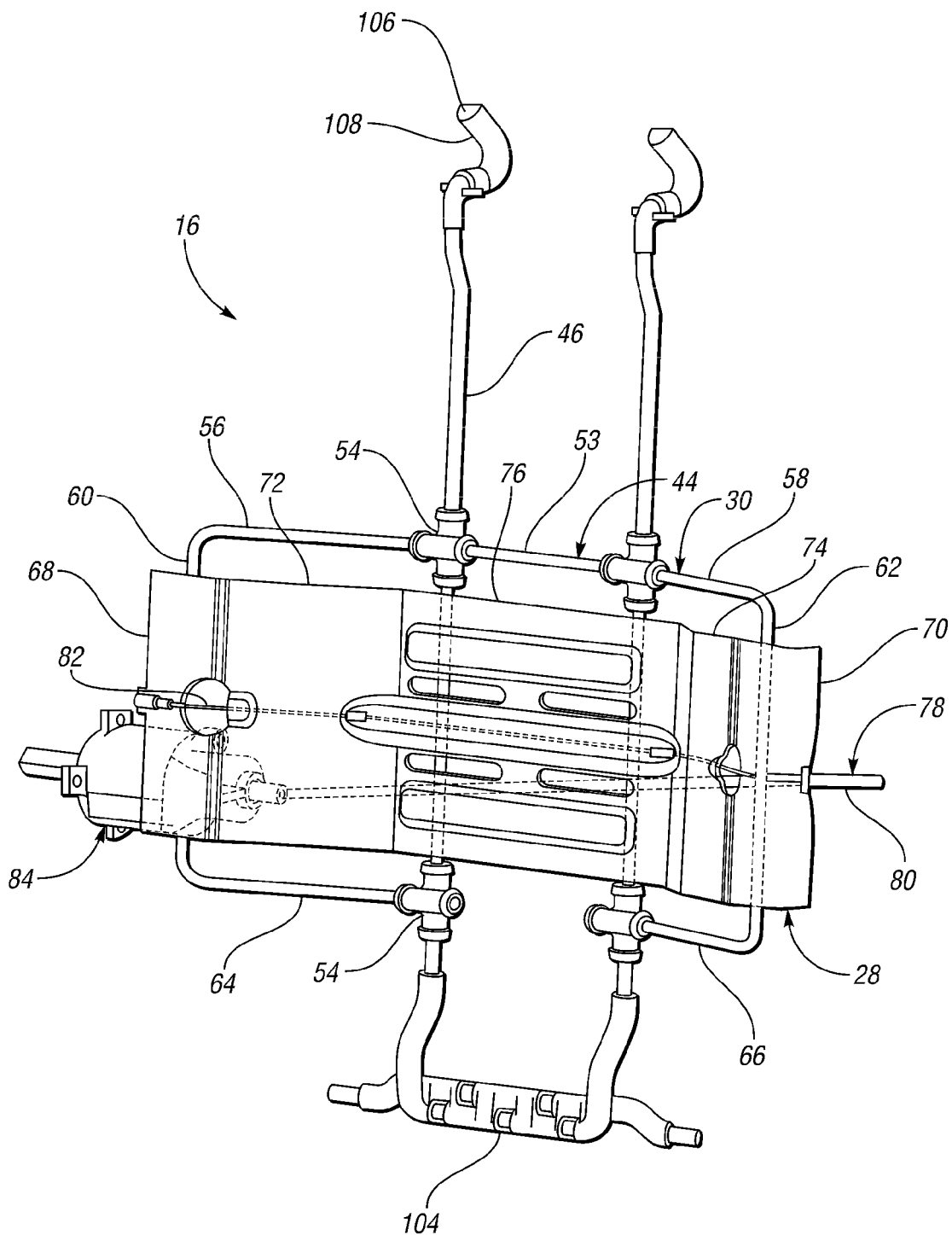
FIG. 2 is a front side perspective view of the lumbar assembly of FIG. 1.
Figure 3:
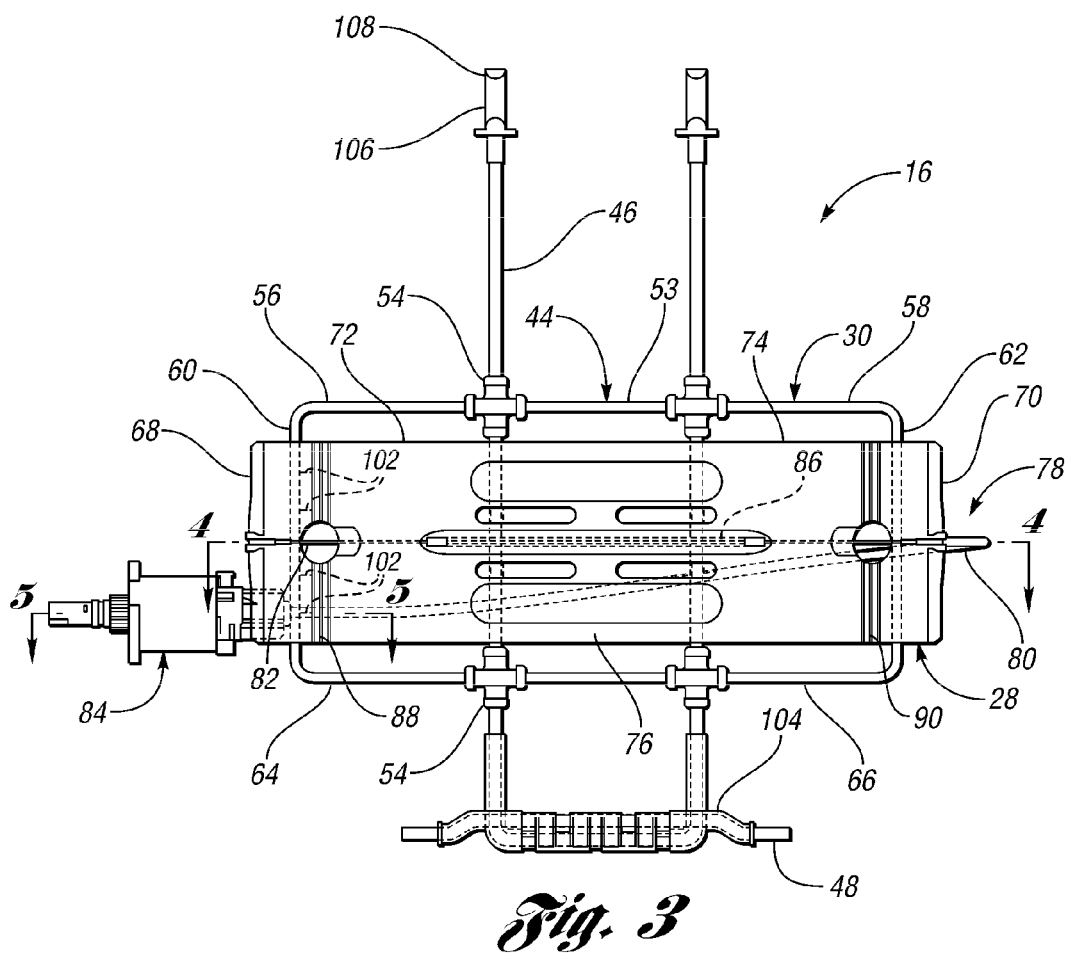
FIG. 3 is a front side elevation view of the lumbar assembly of FIG. 1.

Referring now to FIGS. 2 and 3, the lumbar suspension 16 is illustrated in greater detail. The cross member 44 of the wireframe 30 includes a central region 53 that is connected to the pair of upright wires 46 by overmolded connectors 54. The cross member 44 also includes a pair of lateral regions 56, 58 extending outboard from the central region 53 that are canted in a forward direction. A pair of side members 60, 62 extend downward from the lateral regions 56, 58 of the cross member 44. For additional structural support of the wireframe 30, a second pair of lateral regions 64, 66 extend inward from lower ends of each of the side members 60, 62 and are connected to the upright wires 46, by a pair of overmolded connectors 54.

The support band 28 includes a pair of outboard portions 68, 70 that are each affixed to one of the side members 60, 62 of the wireframe 30. A pair of lateral portions 72, 74 are each pivotally connected to one of the outboard portions 68, 70 and extend laterally inboard towards a central region of the support band 28. A central portion 76 of the lumbar support band 28 extends across the central region and is pivotally connected to both of the lateral portions 72, 74.

A cable assembly 78 is provided for adjusting a position of the support band 28 in a fore/aft direction of the vehicle seat. The cable assembly 78 may be a Bowden cable that includes a sheath 80 connected to the lumbar support band outboard portion 70. An internal cable 82 extends from the sheath 80 behind the support band 28 and is affixed to the other lumbar support band outboard portion 68. The cable assembly 78 is connected to an actuator 84 that is mounted on the seat frame 14 and is manually or electrically operated. Operation of the actuator 84 retracts the cable 82 within the sheath 80 thereby pivoting the lumbar support band lateral portions 72, 74 in a fore/aft direction while also translating the central portion 76 in the fore/aft direction.

Figure 4:
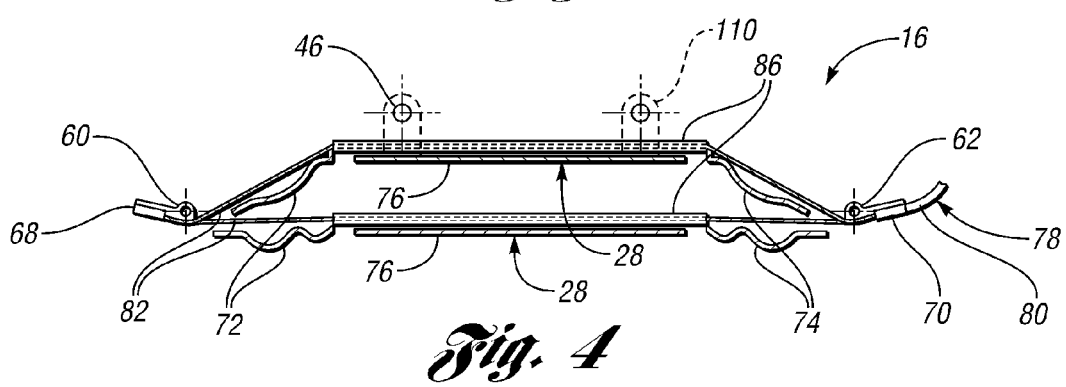
FIG. 4 is a section view taken along section line 4-4 in FIG. 3.

Referring now to FIG. 4, the support band 28 is illustrated in a full rearward orientation and a full forward orientation. In the full rearward orientation, the support band 28 is oriented in a design position, absent any loading from the cable assembly 78. Thus, the central portion 76 extends across the upright wires 46 and the lateral portions 72, 74 are canted in a forward direction to extend to the outboard portion 68, 70 on the side members 60, 62 of the wireframe 30. As the cable 82 is retracted into the sheath 80, the lumbar support band 28 is flexed in the forward direction as illustrated by the full forward position. To return to the rearward position, the cable 82 is extended from the sheath 80 and the lumbar support band 28 unflexes and retracts towards the unloaded or free rearward position. As illustrated in FIG. 4, an additional sheath 86 may be provided about the cable 82 rearward of the lumbar support band central portion 76 to prevent friction between the cable 82 and the lumbar support band 28.

Figure 5:
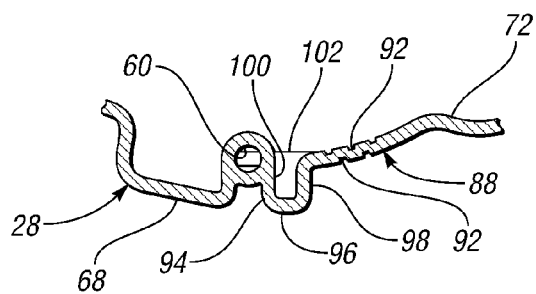
FIG. 5 is an enlarged paritial section view taken along section line 5-5 in FIG. 3.

In order to simplify fabrication of the lumbar suspension 16, the lumbar support band 28 is insert-molded onto the side members 60, 62 of the wireframe 30. Therefore, the side members 60, 62 do not provide a pivotal connection for the lumbar support band 28. Accordingly, a pair of hinges 88, 90 are each provided laterally inboard from the corresponding side members 60, 62. Referring now to FIG. 5, one of the hinges 88 is illustrated in greater detail. The hinge 88 is provided by a series of grooves 92 formed in opposed sides of the lumbar support band 28 for weakening a portion of the lumbar support band 28 for providing the pivotal connection between the lateral portion 72 and the outboard portion 68.

Additionally, the lumbar support band 28 is structurally enhanced between the hinge 88 and the corresponding connection with the side member 60. Each structural enhancement is provided by a first segment 94 extending in a forward direction from the side member 60. A second segment 96 extends laterally inboard from the first segment 94. A third segment 98 extends in a rearward direction from the second segment 96 and connects to the hinge 88. The first, second and third segments 94, 96, 98 collectively form a channel 100 that is bridged incrementally by a series of ribs 102 (FIGS. 3 and 5). The segments 94, 96, 98 and the ribs 102 collectively provide structural enhancement to the lumbar support band 28 between the attachment to the side member 60 and the hinge 88 for controlled and predictable actuation of the lumbar support band 28 for extension and retraction for controlling lumbar support.

Referring again to FIGS. 2-4, the hinges 88, 90 are provided within the material of the support band 28, as opposed to pivoting about the side members 60, 62, so that the lumbar support band 28 can be insert-molded directly onto the wireframe 30, thereby eliminating a manufacturing step of assembling the support band 28 onto the wireframe 30. Thus, the lumbar suspension 16 can be fabricated by forming the wireframe 30, then insert-molding the lumbar support band 28 upon the wireframe 30. Additional features of the suspension 16 can be concurrently co-molded with the lumbar support band 28. For example, the connectors 54 may be co-molded with the lumbar support band 28. Additionally, a connector 104 for connecting the cross wire 48 to the upright wires 46 may be co-molded during this process. An upper end of the upright wires 46 each include a hook 106 for connecting to the armature 36. Each of the hooks 106 may be co-molded in the molding process with a cover 108 for providing a damper between the upright wires 46 and the armature 36 and for eliminating any buzz, squeak and rattle therebetween. After the molding process(es), the cable assembly 78 is connected and the suspension 16 is installed into a vehicle seat.

The invention contemplates utilization of the lumbar support band 28 in a fixed system that does not provide adjustment. For example, the lumbar suspension 16 may be provided without the cable assembly 78 and the actuator 84. In this alternative, the hinges 88, 90 provide compliancy in the lumbar support band 28. Likewise, the structural enhancements between the hinges 88, 90 and the attachments to the side members 60, 62 provide a rigid connection between the outboard portions 68, 70 of the lumbar support band 28 to the wireframe side members 60, 62 for controlled compliancy. As yet another alternative, in a non-adjustable lumbar suspension, the lumbar support band central portion 76 may be molded with connectors 110 about the upright wires 46 as illustrated in phantom in FIG. 4.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustable lumbar assembly for a vehicle seat comprising:
   a wireframe for attachment to a frame of a vehicle seat, the wireframe having first and second spaced apart side members;
   a flexible lumbar support band having a first outboard portion affixed to the first wireframe side member, a first lateral portion extending inboard from the first outboard portion and pivotally connected to the first outboard portion offset from the first wireframe side member, a central portion pivotally connected to the first lateral portion and extending laterally across a central region of the wireframe towards the second wireframe side member, a second lateral portion pivotally connected to the central portion extending laterally towards the second wireframe side member, a second outboard portion affixed to the second wireframe side member and pivotally connected to the second lateral portion offset from the second wireframe side member, and a pair of hinges each providing the pivotal connection between one of the outboard portions and the corresponding lateral portion; and
   a cable assembly mounted to each of the outboard portions of the lumbar support band and cooperating with each of the lateral portions and the central portion for extension and retraction of the lateral portions and the central portion relative to the wireframe for providing adjustment of the lumbar assembly;
   wherein the lumbar support band is structurally enhanced between each hinge and an attachment of the corresponding outboard portion to the wireframe side member; and
   wherein each structural enhancement further comprises a first segment extending in a fore/aft direction from the attachment to the wireframe side member, a second segment extending laterally from the first segment, a third segment extending in a fore/aft direction from the second segment, and a plurality of ribs extending between the first and third segments.

2. The lumbar assembly of claim 1 wherein the pivotal connection of each lateral portion relative to the corresponding outboard portion is offset inboard relative to the corresponding wireframe side member.

3. The lumbar assembly of claim 1 wherein each outboard portion is affixed to the corresponding wireframe side member to prevent rotation of each outboard portion relative to the corresponding wireframe side member.

4. The lumbar assembly of claim 1 wherein each hinge is provided by a weakened portion in the lumbar support band.

5. The lumbar assembly of claim 1 wherein each hinge is provided by at least one groove formed in the lumbar support band.

6. The lumbar assembly of claim 1 wherein each hinge is provided by a plurality of grooves formed in the lumbar support band.

7. The lumbar assembly of claim 1 wherein each structural enhancement is adjacent to the corresponding hinge and the attachment to the wireframe side member.

8. The lumbar assembly of claim 1 wherein the wireframe further comprises a laterally extending cross member having a central region, a pair of lateral regions extending outboard from the central region and canted relative to the central region in a fore direction, wherein the first and second side members each extend from one of the lateral regions in a direction of a seat back frame.

9. A vehicle seat comprising:
   a seat back frame for supporting a back of an occupant having a pair of spaced apart side supports and at least one cross support connected to the pair of side supports;
   an active head restraint system mounted to the seat back frame;
   a head restraint mounted to the active head restraint system to extend from the seat back for supporting a head of the occupant; and
   the lumbar assembly of claim 1 connected to the active head restraint system for receiving an input force for actuating the active head restraint system for moving the head restraint to an actuated position.

10. The vehicle seat of claim 9 wherein the active head restraint system further comprises:
    an armature pivotally connected to the pair of side supports; and
    a pair of posts extending from the armature for supporting the head restraint;
    wherein the lumbar assembly is connected to the armature for actuating the armature in response to the input force.

11. The vehicle seat of claim 10 wherein the wireframe further comprises a pair of upright wires extending above the lumbar support band and connected to the armature.

12. The vehicle seat of claim 11 wherein the pair of upright wires extend below the lumbar support band; and
    wherein the wireframe further comprises a cross wire mounted to a lower end of the upright wires, the cross wire being connected to the seat back frame to translate upward and rearward and to pivot forward upon actuation from the lumbar assembly.

13. The vehicle seat of claim 12 wherein the wireframe further comprises a laterally extending cross member having a central region, a pair of lateral regions extending outboard from the central region and canted relative to the central region in a fore direction, wherein the first and second side members each extend from one of the lateral regions in a downward direction of the seat back frame.

14. The vehicle seat of claim 13 wherein the wireframe further comprises a second pair of lateral regions extending inboard from the side members, and each connected to one of the upright wires.

15. A lumbar suspension for a vehicle seat comprising:
    a wireframe for attachment to a frame of a vehicle seat, the wireframe having first and second space apart side members; and
    a flexible lumbar support band having a first outboard portion affixed to the first wireframe side member, a first lateral portion extending inboard from the first outboard portion and connected to the first outboard portion offset from the first wireframe side member, a central portion connected to the first lateral portion and extending laterally across a central region of the wireframe towards the second wireframe side member, a second lateral portion connected to the central portion extending laterally towards the second wireframe side member, and a second outboard portion affixed to the second wireframe side member and connected to the second lateral portion offset from the second wireframe side member;
    wherein the lumbar support band is structurally enhanced adjacent to an attachment of the corresponding outboard portion to the wireframe side member by a first segment extending in a fore/aft direction from the attachment to the wireframe side member, a second segment extending laterally from the first segment, a third segment extending in a fore/aft direction from the second segment, and a plurality of ribs extending between the first and third segments.

16. The lumbar suspension of claim 15 further comprising a cable assembly mounted to each of the outboard portions of the lumbar support band and cooperating with each of the lateral portions and the central portion for extension and retraction of the lateral portions and the central portion relative to the wireframe for providing adjustment of the lumbar assembly.

17. The lumbar suspension of claim 15 wherein the flexible lumbar support band further comprises a pair of hinges each providing the pivotal connection between one of the outboard portions and the corresponding lateral portion; and
wherein the lumbar support band is structurally enhanced between each hinge and the attachment of the corresponding outboard portion to the wireframe side member.

18. A vehicle seat comprising:
a seat back frame for supporting a back of an occupant having a pair of spaced apart side supports and at least one cross support connected to the pair of side supports;
an armature pivotally connected to the pair of side supports; and
a pair of posts extending from the armature for supporting the head restraint;
a head restraint mounted to the pair of posts to extend from the seat back for supporting a head of the occupant;
a wireframe for receiving an input force, the wireframe comprising a laterally extending cross member having a central region, a pair of lateral regions extending outboard from the central region and canted relative to the central region in a fore direction, and first and second space apart side members each extending from one of the lateral regions in a direction of a seat back frame;
a pair of upright wires extending to the armature for receiving an input force upon the wireframe and actuating the armature for moving the head restraint to an actuated position; and
a pair of overmolded connectors each connecting one of the pair of upright wires to the wireframe.

19. The vehicle seat of claim 18 wherein the wireframe further comprises a second pair of lateral regions extending inboard from the side members; and
wherein the vehicle seat further comprises:
a flexible lumbar support band having a first outboard portion overmolded upon the first wireframe side member, a first lateral portion extending inboard from the first outboard portion and connected to the first outboard portion offset from the first wireframe side member, a central portion connected to the first lateral portion and extending laterally across the central region of the wireframe towards the second wireframe side member, a second lateral portion connected to the central portion extending laterally towards the second wireframe side member, and a second outboard portion overmolded upon the second wireframe side member and connected to the second lateral portion offset from the second wireframe side member, wherein the pair of upright wires extend below the lumbar support band,
a cross wire connected to the seat back frame to translate upward and rearward and to pivot forward upon actuation from the lumbar assembly,
an overmolded connector connecting the cross wire to a lower end of the pair of upright wires, and
another pair of overmolded connectors connecting the upright wires to the second pair fo lateral regions of the wireframe.

20. The vehicle seat of claim 18 further comprising a pair of hooks each overmolded upon one of the pair of upright wires for connecting to apertures formed through the armature.

* * * * *

UNITED STATES PATENT AND TRADEMARK OFFICE
CERTIFICATE OF CORRECTION

Page 1 of 1

PATENT NO. : 7,874,616 B2
APPLICATION NO. : 12/233129
DATED : January 25, 2011
INVENTOR(S) : Roberto D'Agostini It is certified that error appears in the above-identified patent and that said Letters Patent is hereby corrected as shown below:

Column 8, Line 33, Claim 19:

After "second pair" delete "fo"
and insert -- of --.

Signed and Sealed this
Third Day of May, 2011

David J. Kappos
*Director of the United States Patent and Trademark Office*